April 7, 1936.  K. A. MUNSON  2,036,821
MACHINE TOOL DRIVING SYSTEM
Filed Nov. 7, 1935  3 Sheets-Sheet 3

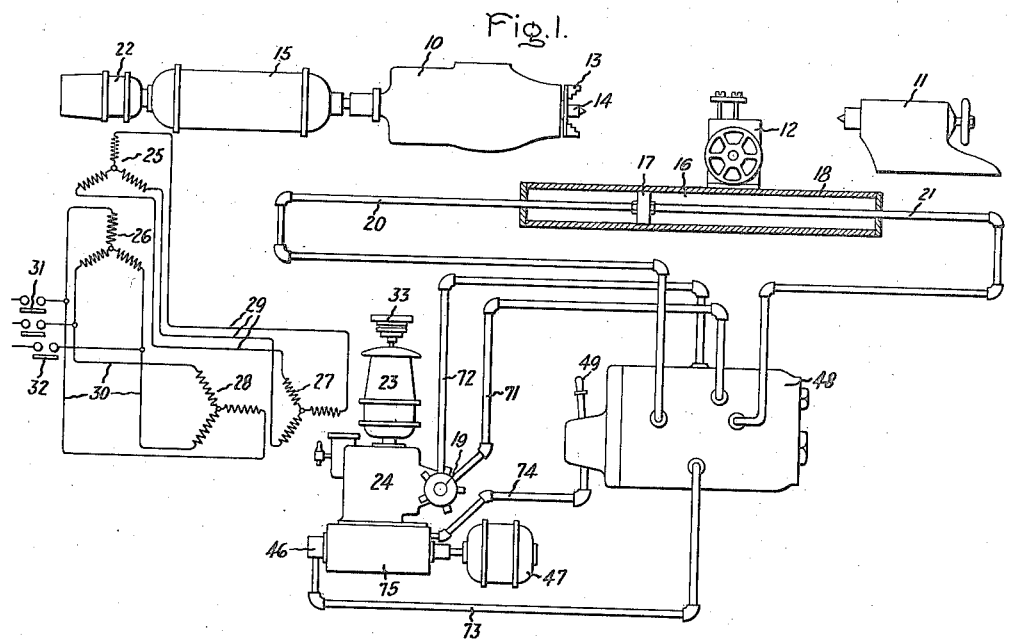

Inventor:
Kenneth A. Munson,
by Harry E. Dunham
His Attorney.

Patented Apr. 7, 1936

2,036,821

UNITED STATES PATENT OFFICE 2,036,821

MACHINE TOOL DRIVING SYSTEM

Kenneth A. Munson, Saugus, Mass., assignor to General Electric Company, a corporation of New York Application November 7, 1935, Serial No. 48,661

3 Claims. (Cl. 82—2)

My invention relates to machine tool driving systems, and more particularly to driving means for feeding the tool to the work in synchronism with the driving means, and has for its object a simple and reliable electrical system for that purpose.

In carrying out my invention I provide electrical devices for interlocking the tool feeding means with the main driving motor for the machine tool in such manner that the tool is fed to the work piece with a speed varying in accordance with the speed of the driving means or of the work-holding means. This feeding of the tool in accordance with the speed of the main driving motor, i. e., in accordance with the speed of the work piece, assures a uniform cut from the tool and therefore maximum efficiency of the machine.

Figure 3:
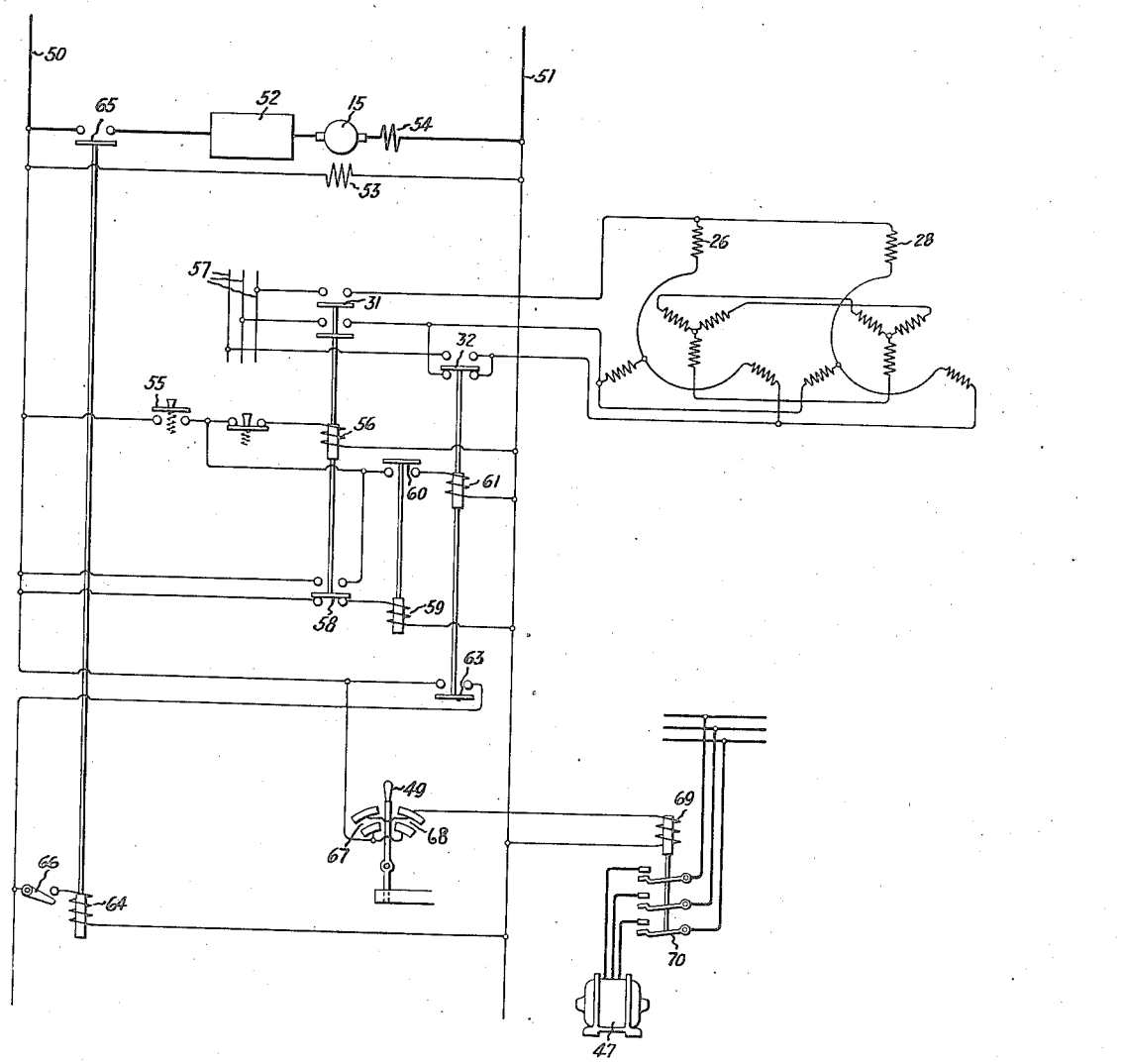
Figure 4:
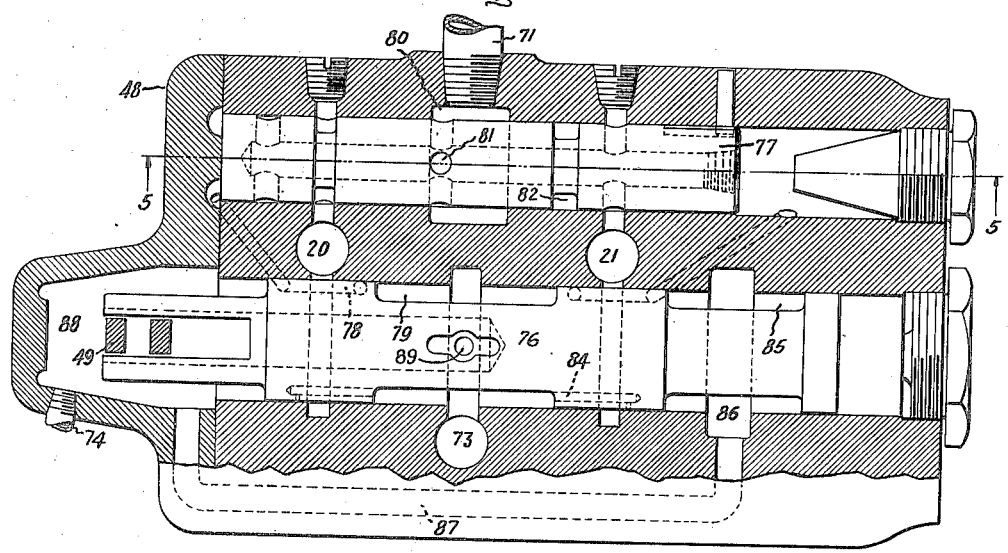
Figure 5:
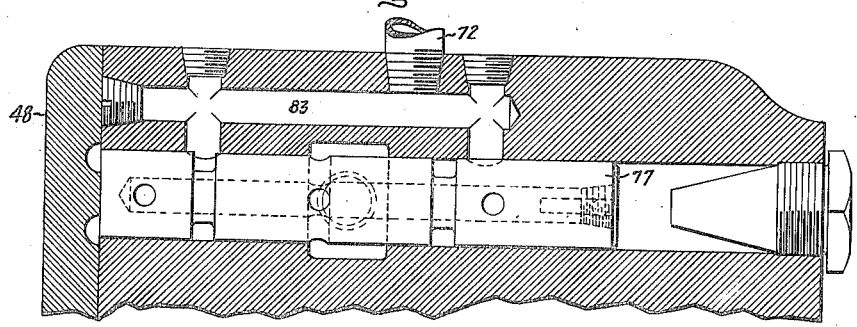

For a more complete understanding of my invention reference should be had to the accompanying drawings, Fig. 1 of which is a diagrammatic representation of a lathe embodying my invention; Fig. 2 is a sectional view of the oscillation damper for the electrical receiving motor; Fig. 3 is a diagram of the electrical control system; while Figs. 4 and 5 are fragmentary sectional views of the control valve.

Referring to Fig. 1 of the drawings, I have shown my invention in one form as applied to a lathe for machining metals comprising the conventional head stock 10, co-operating support 11 for the work piece and a slidably movable tool holder 12. The head stock 10 is provided with a rotatably mounted chuck 13 or other means for holding one end of the work piece, this chuck being mounted on a shaft 14 extending through the head stock and connected to the driving shaft of an electric main driving motor 15 either directly or through a train of gears for reducing or increasing the main driving motor speed.

As shown, the tool support 12 may be moved back and forth between parts 10 and 11, i. e., lengthwise of the work piece, by means of a hydraulic motor 16 comprising a stationary plunger 17 fitting in a cylinder 18 secured to and movable with the tool support 12. Hydraulic fluid such as oil is supplied from a pump 19, preferably of a positive displacement gear or piston type, by means of pipes 20 and 21 to the cylinder on opposite sides of the stationary piston 17, whereby the tool is moved. As shown, the piston 17 is held stationary between the ends of the pipes 20 and 21, which extend into the cylinder from opposite ends through suitable packing glands (not shown). Equivalent mechanical means of moving the tool support may be substituted.

My invention comprehends simple and reliable electric means for driving the hydraulic pump 19 at a speed varying with the speed of the main driving motor 15 so as to supply fluid at varying volumes to the cylinder 18 and thereby move the tool along the work piece with a speed corresponding with the speed of the driving motor, or in other words the speed of the work piece. I have provided electrical means for making this driving connection comprising an electric transmitting generator or device 22 driven by the motor 15 which is electrically connected to a receiving device 23 of similar construction connected through suitable gearing (not shown) in the gear box 24 to drive the pump 19.

The device 22 as shown is provided with two three-circuit distributed windings 25 and 26, each physically similar to a three-phase, Y-connected, distributed winding, one of these windings, i. e. 26, being mounted on the rotor element and the other on the stator element. The receiving device 23 is provided with similar windings 27 and 28, except that a predetermined ratio of number of poles of transmitter and receiver windings is preferably provided to reduce the pump speed. For example, a two-pole transmitting device and four-pole receiving device may be used to give a 2:1 reduction in speed in the electrical connection. Like terminals of the two rotor windings 25 and 27 are interconnected by three conductors 29, and the stator windings 26 and 28 likewise have their terminals interconnected by three conductors 30. Moreover one of the windings of each pair, for example the stator windings 26 and 28, serve as field windings and are electrically connected by means of a two-pole switch 31 and a single-pole switch 32 to a suitable three-phase supply source. It will be understood that the devices 22 and 23 may be provided with windings different from those shown, for example the field windings 26 and 28 may be single-circuit windings and connected to a single phase supply source.

With the two windings 26 and 28 thus supplied with three-phase alternating current, the two rotors of the devices 22 and 23 are electrically interlocked so that the rotor of the device 23 turns in exact synchronism with the rotor of the device 22, but at twice the speed of the device 22. The voltages induced in the windings 25 and 27 normally are equal and opposite and consequently no currents flow in these windings. Any angular disagreement or displacement, however, produces a voltage unbalance with consequent current flow and torque causing the device 23 to follow the device 22. Consequently the fluid motor 19 is driven by the receiving device 23 in exact synchronism with the driving motor 15 or the work-holding device, but at one-half the speed.

For the purpose of preventing objectionable oscillations of the rotor of the receiving device 23 I have provided on the rotor of the receiving device a rotary oscillation damper 33. As shown in Fig. 2, this device comprises a fly wheel rim 34 of substantial inertia as compared with the inertia of the rotating parts of the receiving end. This rim is secured to a central disk or hub 35 which is rotatably mounted on a supporting means 36 secured to the shaft 37 of the receiving device 23. A disk 38 similar in construction to the disk 35 is mounted opposite the disk 35 on the support 36 between the flanges 39 and 40. These two disks are yieldingly forced apart by a series of helical compression springs 41 arranged around the axis of the support 36, only one of which is shown, and a ring 42 made of rubber. One of the flanges, as shown, the flange 40, is provided with a friction clutch face 43 which engages a similar clutch face 44 on the ring 38. The two disks 35 and 38 are secured together against relative rotation by one or more pins 45.

In the operation of the oscillation damper any sudden movement of the rotor of the device 23 is effected to a certain extent independently of the fly wheel mass 34, the clutch faces 43 and 44 slipping upon each other. This slipping of the clutch faces dissipates energy, however, and as a result the oscillations of the rotor of the receiving device 23 are damped out quickly. The various parts of the damping device, such as the springs 41 and the rubber ring 42, are relatively arranged and proportioned to give the amount of frictional engagement between the clutch faces requisite to the desired degree of damping.

These oscillations may be caused for example by sudden changes in speed of the driving motor 15 incident for example to starting of the driving motor, or they may be caused by connection of the electrical devices to the three-phase supply source when the receiving device is out of angular agreement with the transmitting device by a substantial angle. In the latter case the receiving device snaps quickly at high speed into angular agreement and, without the oscillation damper, oscillates for an interval before finally synchronizing in angular agreement. In extreme cases under these circumstances the receiver, if no damper were provided, might even accelerate to a speed high enough to run as an induction motor.

I have also provided a fluid pump 46 driven by a separate electric driving motor 47 for supplying fluid to the cylinder 18 for rapid traverse movement, for example, in returning the tool after the completion of the cutting operation. The connections between the pumps 19 and 46 and the cylinder 18 are controlled by means of a suitable fluid valve 48 operated by a handle 49 (Fig. 3) to selectively connect the pumps to the cylinder.

Referring to Fig. 3, the driving motor 15 is preferably a D. C. motor supplied from D. C. supply mains 50 and 51, a suitable time-starting device 52 (not shown in detail) being included in the motor circuit. The motor is provided with a shunt field winding 53 and a series field winding 54.

In order to start the machine tool, a normally open push button 55 is closed to energize the coil 56 which closes the two-pole switch 31 in circuit between two mains of the three-phase supply source 57 and the windings 26 and 28. At the same time the coil 56 operates a switch contact 58 to its upper position, closing a holding circuit around the push button 55 for the coil 56. This energization of two coils of each of the windings 26 and 28 and the third coil in parallel with one of the other two through the switch 32 which is in its lowermost position as shown causes the receiving device 23 to snap quickly into angular agreement, in case there is any disagreement, with the transmitting device. Under these conditions, however, the receiving device does not have a rotating field and consequently its tendency to synchronize for continuous motor operation is not as great as it would be if three-phase energy were supplied to the windings 26 and 28.

It will be observed also that movement of contact 58 to its upper position also opens the circuit through its lower pair of contacts and the coil 59 which is holding a switch 60 open. The coil 59 is provided with a suitable electro-magnetic or other time element device which delays its de-energization or operation so that the switch 60 closes at a predetermined time interval, such as several seconds, after the de-energization of the coil 59. The closure of the switch 60 energizes the coil 61 which moves the single-pole switch 32 to the upper position, thereby completing the connections between the three-phase supply source and windings 26 and 28. At the same time, the coil 61 closes a switch 63 in a control circuit for the operating coil 64 for the motor switch 65. The motor 15 may now be started by closing the switch 66.

The motor 47 is started by means of single-pole two-way switches operated by the handle 49 for the hydraulic valve 48. With the handle 49 in a mid-position as shown in the drawings, the control valve is in a central closed position as will presently be described. When the handle is moved to operate the valve in a desired direction to give the desired direction of traverse, the handle closes the switch 67 or the switch 68, as the case may be, for example by means of a bridging contact carried by the handle, and energizes the operating coil 69 for the switch 70 in circuit with the motor 47. The motor 47 is therefore started concurrently with the movement of the controlled valve. The switch 67 or 68, as the case may be, is arranged to be closed while the handle 49 is in its two operative positions on each side of the mid-position shown.

In Figs. 4 and 5 I have shown one form of control valve 48. The pump 19 is connected to the control valve by an outlet pipe 71 leading from the pump and a return pipe 72. In a similar manner the pump 46 is connected to the control valve by an outlet pipe 73 and a return pipe 74 leading to an oil reservoir 75.

Referring to Figs. 4 and 5, the connections between the various pipes and the control valve 48 are indicated by reference characters corresponding with those used for the pipes. The operating handle 49 operates a main control valve 76, and the position of this main valve in turn controls the position of a pilot valve 77. As shown in Fig. 4, the main valve 76 is in its central position while the pilot valve 77 is in its extreme left hand position. The main valve has two positions on each side of the central position shown. The first positions on each side of the central position control the supply of hydraulic fluid from the pump 46 to the ends of the chamber containing the pilot valve whereby the position of the pilot valve is controlled to connect the feed pump 19 to the fluid motor to give the desired movement of the tool. The second position from the central position controls the connection of the rapid traverse pump 46 to the hydraulic cylinder for rapid traverse in the desired direction.

Movement of the main valve 76 in either direction causes an opposite movement of the pilot valve to its left hand or right hand position provided of course the pilot valve is not already in that position. For example, assume that the main valve is moved toward the left to its first position, which is just far enough to connect a port 78 with the center space 79 provided in the main valve chamber. Fluid under pressure is then supplied from the pipe 73 through the port 78 to the left hand end of the pilot valve, whereby the pilot valve is moved to its extreme right hand position. In this latter position of the pilot valve, fluid is supplied from the feed pump through pipe 71 to the central space 80 and thence through the port 81 running centrally of the pilot valve to the port 20 with which 81 is then in register. The port 20 of course leads through the pipe 20 to the left hand end of the cylinder 18. Also in this position of the pilot valve the pipe and port 21 is connected by the annular space 82 in the pilot valve to an outlet port 83 (Fig. 5) from which the fluid returns through the pipe 72. At the same time a small port 84 in the main valve registers with the port 21 whereby fluid from the rapid traverse pump is supplied to the exhaust end of the hydraulic cylinder to maintain the pressure of the pump 46 in the exhaust end of the cylinder, the pump 19 maintaining a higher pressure.

Assuming now that it is desired to traverse rapidly the tool in the same direction, the main valve 76 is moved by the handle 49 to its extreme left hand position in which position the central space 79 communicates with the port 20, thereby applying full fluid pressure from the rapid traverse pump to the left hand end of the hydraulic cylinder. At this time the small port 84 is closed. The pilot valve remains as before in its extreme right hand position and consequently exhaust fluid from the right hand end of the hydraulic cylinder returns through port 21 as before to the feed pump 19, and also returns through the pipe 74 to the reservoir 75. This return is effected through the space 85 in the main valve, which then communicates with the port 21 connecting the port 21 to the passage 86. The passage 86 is connected through a port 87 to the chamber 88 at the opposite end of the main valve. This chamber communicates with pipe 74.

It is believed to be unnecessary to describe the connections established by operation of the main control valve to its two right hand positions in view of the previous description. It should be noted, however, that when the main valve is in its central position as shown, fluid entering the port 73 passes into a port 89 extending centrally through the main valve toward the left, and communicating with the space 88. Thus no pressure is built up by the rapid traverse pump 46 at that time. When the main valve is moved to its first position in either direction, however, the port 89 is closed by the walls of the valve chamber, the space or spaces 79 being formed by cutting away the sides of the central portion of the valve.

While I have shown a particular embodiment of my invention, it will be understood, of course, that I do not wish to be limited thereto since many modifications may be made, and therefore contemplate by the appended claims to cover any such modifications as fall within the true spirit and scope of my invention.

What I claim as new and desire to secure by Letters Patent of the United States is:

1. In a machine tool, driving means, tool feeding means, means for driving said tool feeding means in accordance with the speed of the driving means comprising an alternating-current transmitting device driven by said driving motor, a polycircuit armature winding and a field winding for said transmitting device, one of said windings being rotatably mounted, a receiving device similar in construction to said transmitting device connected to said tool feeding means, electrical connections between the armature windings of said devices, connections for supplying alternating current to said field windings, said receiving device reproducing the rotational movement imparted to said transmitting device by said driving means and thereby operating said tool feeding means in accordance with the operation of said driving means.

2. In a machine tool, driving means, a tool carriage, hydraulic operating means for moving said carriage, a pump for supplying a liquid under pressure to said operating means, an electric receiving device for operating said pump, said device being provided with a polycircuit armature winding and a field winding, a transmitting device having similar windings connected to be driven by said driving means, electrical connections between the armature windings of said devices and connections for supplying alternating current to said field windings to thereby cause said receiving device to follow said transmitting device and drive said pump at a speed corresponding with the speed of said driving means whereby said tool carriage is operated to feed the tool in accordance with the speed of said driving means.

3. In a machine tool, driving means, tool feeding means, means for driving said tool feeding means in accordance with the speed of said driving means, comprising an alternating-current transmitting device driven by said driving means, three-circuit distributed armature windings on the rotor and stator elements of said device, an alternating-current receiving device of similar construction connected to drive said tool feeding means, electrical connections interconnecting the windings of each of said devices with the corresponding windings of the other device, a two-pole switch for connecting two poles of one pair of said windings to a three-phase supply source, parallel switching means connecting the remaining pole to one of said two poles, a single-pole switch for connecting said remaining pole of said windings to the remaining phase of said supply source, an operating coil for closing said two-pole switch for energization of said devices to cause the receiving device to move into angular agreement with the transmitting device, timing means set in operation by the operation of said two-pole switch to the closed position for opening said parallel switching means and thereafter closing said single-pole switch after a predetermined time interval, whereupon said receiving device controls said tool feeding means in accordance with the speed of said driving means.

KENNETH A. MUNSON.